United States Patent
Escobar Benavides et al.

(10) Patent No.: US 7,678,437 B2
(45) Date of Patent: Mar. 16, 2010

(54) METALLIC LOCAL REINFORCEMENT FOR HEAVY LOADED JOINTS OF COMPOSITE COMPONENTS

(75) Inventors: Francisco de Paula Escobar Benavides, Madrid (ES); Daniel Claret Viros, Madrid (ES); Rafael Avila Dominguez, Madrid (ES)

(73) Assignee: Airbus Espana, S.L., Madrid (ES)

( * ) Notice: Subject to any disclaimer, the term of this patent is extended or adjusted under 35 U.S.C. 154(b) by 353 days.

(21) Appl. No.: 11/643,749

(22) Filed: Dec. 21, 2006

(65) Prior Publication Data
US 2007/0154680 A1    Jul. 5, 2007

(30) Foreign Application Priority Data
Dec. 21, 2005   (EP)   .................................. 05381062

(51) Int. Cl.
B32B 3/06       (2006.01)
B32B 3/08       (2006.01)
(52) U.S. Cl. .......................... 428/57; 428/189; 244/131

(58) Field of Classification Search ................... 428/57, 428/189, 192; 244/131, 119; 403/267
See application file for complete search history.

(56) References Cited

U.S. PATENT DOCUMENTS 5,866,272 A * 2/1999 Westre et al. ................ 428/593
6,419,189 B1 * 7/2002 DiChiara et al. .......... 244/123.1
6,502,788 B2 * 1/2003 Noda et al. ............... 244/123.3

* cited by examiner

Primary Examiner—Alexander Thomas
(74) Attorney, Agent, or Firm—Ladas And Parry LLP

(57) ABSTRACT

A mechanically fastened permanent or detachable joint between two or more parts (21, 23, 25, 41), at least one of them made of a composite material, preferably carbon fibers impregnated with thermoset resin, with continuous plies from the full-composite area along the joint area (15) and including a metal reinforcement, preferably made of titanium, in the joint area (15), the joint area (15) thickness being increased in the thickness of said reinforcement plus the eventual additional composite plies laid only on the reinforced area. The metal reinforcement may consist of one or more metal foils or sheets (31) interleaved between the composite plies or one or more metal plates (33) embedded between two of the composite plies.

11 Claims, 2 Drawing Sheets

METALLIC LOCAL REINFORCEMENT FOR HEAVY LOADED JOINTS OF COMPOSITE COMPONENTS

FIELD OF THE INVENTION

The present invention refers to a structural concept of hybrid joint consisting of metallic foils, sheets or plates locally embedded into a composite part.

A preferred application of the hybrid reinforcement is to strengthen heavy loaded bolted joints, fittings or other complex three-dimensional parts of an aircraft.

BACKGROUND OF THE INVENTION

Modern history of hybrid Fibre/Metal materials starts on the early eighties: Delft University of Technology introduced ARALL (an Aramid/Aluminium Fibre Metal Laminate—FML-) in 1981. Later, Delft-TU together with Fokker Aerospace developed GLARE (Glass Fibre/Aluminium FML), solving structural limitations that prevented a wide use of ARALL. This has been shown with the introduction of GLARE as replacement of monolithic aluminium on some parts of the largest passenger aircraft program, the A380, in 2001.

For other applications, different combinations of materials could be more suitable. In this context, Boeing research programs dealing with Titanium/CFRP (Carbon Fibre Reinforced Plastic) FML during the development of the High Speed Civil Transport (HSCT) is an example: sandwich material made of IM7/PIXA (thermoplastic resin) core with titanium facesheets as high temperature and fatigue resistant material. Also to be applied on the same HSCT program, The Boeing Company obtained in 1999 the patent U.S. Pat. No. 5,866,272 (Titanium-Polymer Hybrid Laminates), where a symmetric hybrid laminate consisting of a central honeycomb core with a number of titanium foils and carbon layers is described.

In parallel, NASA-Langley Research Center performed investigations, also to be applied to a HSCT aircraft, with FML consisting of IM7 carbon tapes (polyamide thermoset resin) with Ti-15V-3Cr-3Al-3Sn foils. Different titanium surface treatments were examined (Report Ref. NASA-98-21 amas-wsj).

As example of a different application, the German Aerospace Centre (DLR—Deutches zentrum fur Luft und Raumfahrt) proposed in 2003 a concept for the transition of a full-CFRP part to a hybrid Ti/CFRP one by progressively replacing most of the carbon tapes by titanium foils in a certain patented manner called "Lamella Coupling System" (WO00/56541, 28$^{th}$ Sep. 2000). The reinforced region results in having Ti foils combined with some of the original 0° plies. Prepregs used were Ciba 6376C-HTA/HTS mixed with Ti-6Al-4V alloy sheets.

A common issue with all fibre/metal materials is the required surface treatment to be applied to the metal to ensure a proper bonding to the composite or to the adhesive layer if exists. With new regulations, old and complex pollutant methods containing high levels of Volatile Organic Compounds (VOC) are no longer allowed. After a joint program involving the U.S. Air Force, the U.S. Navy, the U.S. Army and U.S. Industry Department under a SERDP (Strategic Environmental Research and Development Program) Project numbered PP-1113, the Boeing Company selected the so-called Boegel-EPII as the most promising low-VOC surface treatment technology for titanium bonding. This product is commercially available as AC™-130, from Advanced Chemistry & Technology, Garden Grove, Calif.

Hybrid materials have been used in butt-joints of composite components. For instance GB 1,081,154 published on Aug. 31, 1967 discloses a butt-joint between adjacent ends of reinforced laminated synthetic resin sheet material, such as the ends of a sheet bent to the shape of a cylinder to produce a synthetic-resin silo, in which metal strips are embedded in the adjacent ends and are interconnected.

However hybrid materials have not been used as local reinforcement in heavy loaded lap joints on aircraft primary structures made of composite materials. In this respect a common practice to ensure proper load transfer on current aircraft primary composite structures' heavy loaded joints is to thicken the laminate with additional plies until the required strength is achieved. With this, thickness of the joint can be significantly increased, as thus the weight will do. Examples of heavy loaded joints of typical carbon fibre components could be mechanically fastened joints of spars to skin lifting surfaces, mid-box joints, joints of composite fuselage sections or fitting attachments.

The present invention is intended to solve this drawback.

SUMMARY OF THE INVENTION

The present invention proposes a mechanically fastened joint between two or more parts superimposed in the joint area, being made at least one of said parts of composite material, wherein said composite part has a metal reinforcement in the joint area and in which the plies of the full-composite area are continuous along the joint area so that the joint area thickness is increased in the thickness of said reinforcement.

Said composite part may also include additional composite plies laid only in the joint area in addition to the metal reinforcement.

The present invention embodies in particular a new application of metal on full composite parts as local reinforcement to reduce bolted joint structural weight and thickness for permanent or detachable joints. Internal Airbus España research has demonstrated that, on heavy loaded bolted joints, interleaving one or more foils, sheets or plates of metal, particularly titanium, into the composite part allow a local optimisation. The advantage is encountered whether the case is single or double lap shear joints, lugs or other fixing architectures. Such optimisation is traduced onto weight and thickness reduction of the joint, with subsequent eccentricity decrease what improves carbon composite joint performance.

A basic characteristic of this invention is that carbon plies coming from the full-composite area are not interrupted along the reinforcement, ensuring a proper load transfer. Ti foils replace most or all additional CFRP lamina that would have been necessary to strengthen and thicken up the bolted joint on a full CFRP joint whether permanent or detachable as it is usual in aircraft architectures. Eventually, depending on the detailed design, some additional composite plies could be needed in addition to the Ti foils or plates.

Other characteristics and advantages of the present invention will be clear from the following detailed description of embodiments illustrative of its object in connection with the attached figures.

DETAILED DESCRIPTION OF THE INVENTION

Figure 1:
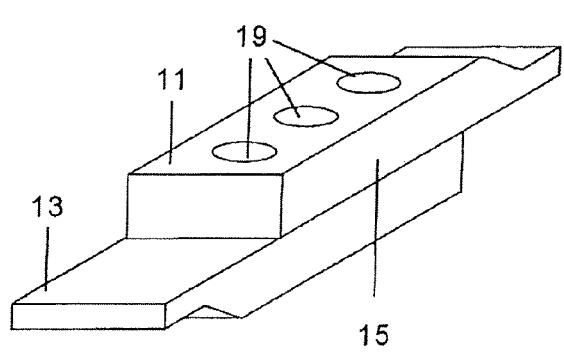
FIG. 1 shows a sketch of a typical full CFRP reinforcement on a bolted joint between two carbon fibre parts at single-lap shear.

In known heavy loaded joints between two composite parts 11, 13 (see FIG. 1) both parts 11, 13 are thickened in the joint area 15 with additional plies until the required strength is achieved resulting in a reinforced joint area 15.

Figure 2:
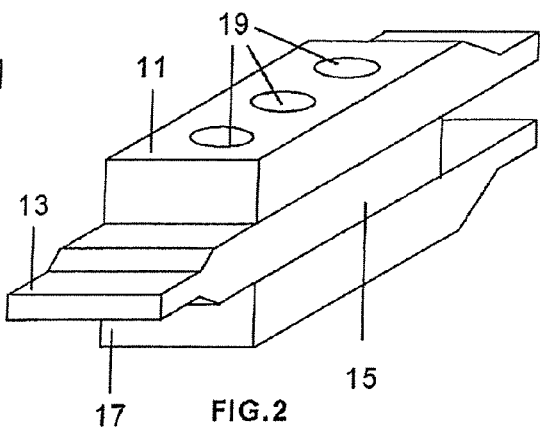
FIG. 2 shows a sketch of a typical full CFRP reinforcement on a bolted joint at double-lap shear.

Similarly in heavy loaded joints between three composite parts 11, 13, 17 (see FIG. 2) the three parts 11, 13, 17 are thickened in the joint area 15 with additional plies until the required strength is achieved resulting in a reinforced joint area 15.

In both cases fastening means such as bolts (not shown) will be used through holes 19 drilled in each part 11, 13, 17 in the zones to be joined.

Figure 3A:
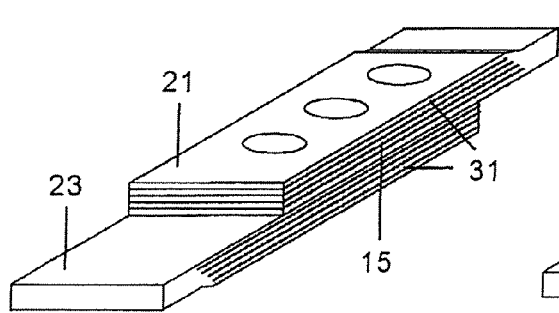
FIG. 3a shows a sketch of a bolted joint between two parts at single-lap shear reinforced with several titanium foils interleaved in both parts.
Figure 4A:
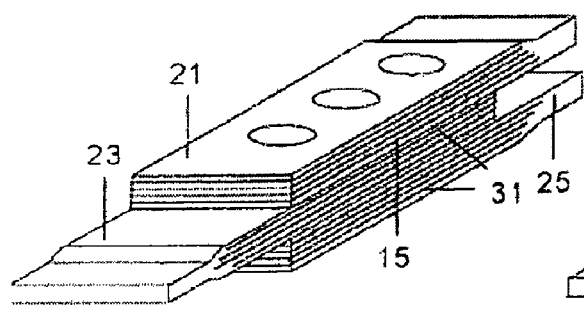
FIG. 4a shows a sketch of a bolted joint between three parts at double-lap shear reinforced with several titanium foils interleaved in the three parts.

In a preferred embodiment of the invention shown in FIGS. 3a and 4a, all parts 21, 23; 21, 23, 25 been joined have titanium foils 31 interleaved as reinforcement into the carbon fibre laminates.

Figure 3B:
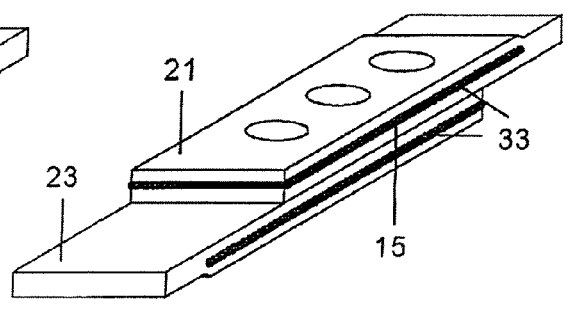
FIG. 3b shows a sketch of a bolted joint between two parts at single-lap shear reinforced with a titanium plate embedded in both parts.
Figure 4B:
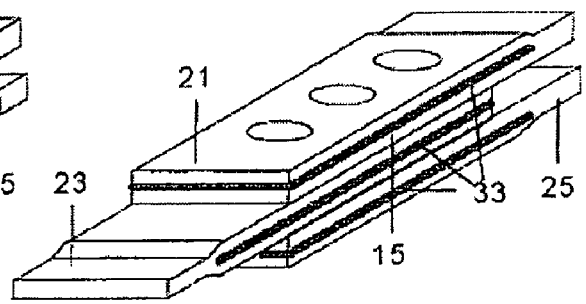
FIG. 4b shows a sketch of a bolted joint between three parts at double-lap shear reinforced with a titanium plate embedded in the three parts.
Figure 5A:
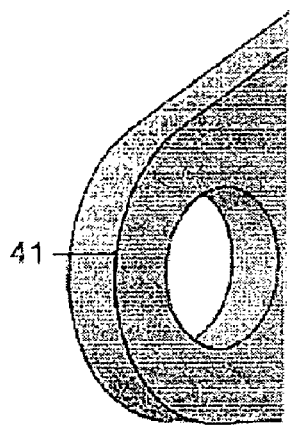
FIGS. 5b and 5a show drawings of single lugs with and without titanium reinforcements.
Figure 5B:
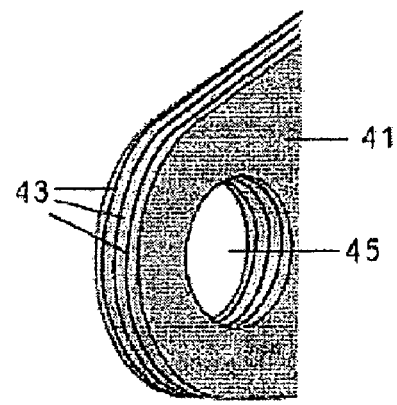

In another preferred embodiment of the invention shown in FIGS. 3b and 4b, all parts 21, 23; 21, 23, 25 have one titanium plate 33 embedded as reinforcement into the carbon fibre laminates.

In another preferred embodiment one of the parts is a composite lug 41 having a metal reinforcement of titanium foils 43. Typically, lugs made of composite materials currently in production (attachment of Horizontal Tail Plane to Fuselage for example) need a very thick section due to out-of-plane loading. The use of metal reinforcements on such parts might allow major reductions in thickness, eccentricity and weight.

Apart from the above-mentioned embodiments the present invention includes any embodiment in which at least one of the parts being joined is a composite part with a metal reinforcement.

By interleaving the foils 31 or embedding the plates 33 in at least one of the parts being joined, a thickness increase is created on the joint area 15. However, the eccentricity is notably reduced when comparing to the full CFRP reinforced joints shown in FIGS. 1 and 2. Therefore, interleaving foils 31 or plates 33 allow reducing the overall thickness of the joint, reducing thus the eccentricity (while improving composite performance) but also doing the structure more efficient, i.e., lighter.

In another preferred embodiments the joint is detachable, in particular for joint architectures such as joints of 2 parts at single-lap shear, joints of 3 parts at double-lap shear, joints of more than 3 parts and lugs. As often occurs during aircraft lifetime, structures need being inspected for maintainability reasons and sometimes repaired or replaced if defects are encountered. The application of the invention here described is compatible with these maintainability/reparability aspects linked to the aircraft industry as structures using the invention can be taken apart.

The amount of the titanium foils 31, 43 or titanium plates 33 in the reinforced part or parts will be set when sizing the parts during the design phase, whereas the thickness of the foils to be used will need a compromise between stress requirements, manufacturing restrictions and supplier availability always subjected to current design principles for this kind of reinforcements. Therefore, depending on the kind of part, manufacturing process and/or supplier, titanium foils or sheets ranging from tenths of a millimeter to plates of several millimeters could be used. With all these restrictions, additional composite plies for the reinforcement area could be needed together with the Ti foils in order to achieve the desired joint strength.

Intermediate Modulus (IM) or High Strength (HS) carbon fibres impregnated with thermoset resin are the preferred materials for the composite parts 21, 23, 25, 41. Any other kind of carbon and/or other fibres (glass, aramid, boron, basalt, etc.), and/or other resin systems, such as thermoplastic (TP) or bismaleimide (BMI) for example, and/or other metals (aluminium, steel, magnesium, etc.) are also suitable to take advantage of this structural concept.

Titanium is the preferred material for the metal reinforcement. Ti sheets selected were pre-treated and delivered ready to be added to the composite parts.

The reinforcement consisting on Titanium foils, sheets or plates is placed during the lamination, keeping internal Airbus rules for drop-offs for the transition from full CFRP to hybrid CFRP/Ti, whether it is performed by means of ATL, or FP machines, hand laid-up or other prepreg processing technology. Eventually, adhesive layers could or not be needed between the composite plies and the titanium foils, sheets or plates.

Titanium foils, sheets or plates could also be used on parts manufactured by means of dry textile injection/infusion technologies (RTM, RFI, LRI, etc.), taking into account the specificities of those processes.

Bolts, rivets or any kind of fastener are suitable means for mechanically fasten the joint.

Modifications may be introduced in the preferred embodiment just set forth, which are comprised within the scope defined by the following claims.

The invention claimed is:

1. A mechanically fastened lap joint between two or more parts each made with plies of a composite material wherein said parts are superimposed on each other at the location of the joint and at least one of said parts comprises a metal reinforcement ply between plies of composite material in the joint area and its plies of composite material are continuous along the joint area so that its thickness is increased in the joint area by the thickness of said metal reinforcement.

2. A mechanically fastened lap joint between two or more parts according to claim 1, wherein said at least one of said parts (21, 23, 25, 41) also comprises a composite reinforcement in the joint area (15) consisting of additional composite plies laid only in the joint area (15) increasing additionally the thickness of the joint area (15) in the thickness of said composite reinforcement.

3. A mechanically fastened lap joint between two or more parts according to claim 1, which comprises at least three parts (21, 23, 25) made with plies of a composite material.

4. A mechanically fastened lap joint between two or more parts according to claim 1, wherein one part (41) having a metal reinforcement has a lug shape in the joint area (15) and the joint is formed by a fastening passing through the lug hole (45).

5. A mechanically fastened lap joint between two or more parts according to claim 1, wherein the joint is formed by a permanent fastening.

6. A mechanically fastened lap joint between two or more parts according to claim 1, wherein the joint is formed by a detachable fastening.

7. A mechanically fastened lap joint between two or more parts according to claim 1, wherein said metal reinforcement consists of one or more metal foils or sheets (31) interleaved between the plies of the composite material.

8. A mechanically lap fastened joint between two or more parts (21, 23, 25, 41) according to claim 1, wherein said metal reinforcement consist of one or more metal plates (33) embedded between two plies of the composite material.

9. A mechanically fastened lap joint between two or more parts (21, 23, 25, 41) according to claim 1, wherein the composite parts are made of carbon fibres impregnated with thermoset resin.

10. A mechanically fastened lap joint between two or more parts according to claim 1, wherein the metal reinforcement is made of titanium.

11. A mechanically fastened lap joint between two or more parts according to claim 1, wherein the joint is fastened by bolts.

* * * * *